(12) United States Patent
Bateman et al.

(10) Patent No.: US 12,010,959 B2
(45) Date of Patent: Jun. 18, 2024

(54) SYSTEMS AND METHODS FOR HYDROPONIC PLANT GROWTH

(71) Applicant: GROWPURA LIMITED, Preston (GB)

(72) Inventors: Nicholas Bateman, Preston (GB); Joanne Bayley, Cornwall (GB)

(73) Assignee: GROWPURA LIMITED, Preston (GB)

(*) Notice: Subject to any disclaimer, the term of this patent is extended or adjusted under 35 U.S.C. 154(b) by 750 days.

(21) Appl. No.: 16/236,631

(22) Filed: Dec. 30, 2018

(65) Prior Publication Data

US 2019/0133063 A1    May 9, 2019

Related U.S. Application Data

(63) Continuation of application No. PCT/GB2017/051925, filed on Jun. 30, 2017.

(30) Foreign Application Priority Data

Jun. 30, 2016 (GB) .................................. 1611428

(51) Int. Cl.
| | |
|---|---|
| *A01G 31/04* | (2006.01) |
| *A01G 7/04* | (2006.01) |
| *A01G 9/14* | (2006.01) |
| *A01G 31/06* | (2006.01) |

(52) U.S. Cl.
CPC ........... *A01G 31/042* (2013.01); *A01G 7/045* (2013.01); *A01G 9/143* (2013.01); *A01G 31/04* (2013.01); *A01G 31/06* (2013.01); *Y02P 60/21* (2015.11)

(58) Field of Classification Search
CPC ...... A01G 31/04; A01G 31/042; A01G 31/06; Y02P 60/216
USPC ......................................................... 47/62 R
See application file for complete search history.

(56) References Cited

U.S. PATENT DOCUMENTS

| | | | | |
|---|---|---|---|---|
| 1,939,015 | A * | 12/1933 | McLellan | A01G 9/143 47/17 |
| 3,717,953 | A * | 2/1973 | Kuhn | A01G 18/62 47/1.1 |
| 3,771,258 | A * | 11/1973 | Charney | A01G 31/042 47/17 |

(Continued)

FOREIGN PATENT DOCUMENTS

| | | | |
|---|---|---|---|
| CH | 697385 B1 * | 9/2008 | ............. A01G 31/06 |
| CN | 202799834 | 3/2013 | |

(Continued)

OTHER PUBLICATIONS

WIPO, International Search Report in corresponding PCT application PCT/GB2017/051925, dated Oct. 16, 2017.

(Continued)

*Primary Examiner* — Morgan T Jordan
(74) *Attorney, Agent, or Firm* — Alley IP

(57) ABSTRACT

Typically greenhouse crop production uses 85% of the floor area for growing crops. The present invention provides a fourfold increase in the usable growing area by using a conveyor to move plants around a closed loop (11), with a plurality of carriages mounted on the conveyor and at least one tray (7) configured to be received on each of the plurality of carriages, each tray (7) configured for growing at least one plant by means of hydroculture.

7 Claims, 6 Drawing Sheets

(56) References Cited

U.S. PATENT DOCUMENTS

| | | | | |
|---|---|---|---|---|
| 3,824,736 | A | * | 7/1974 | Davis ..................... A01G 9/24 47/17 |
| 3,913,758 | A | * | 10/1975 | Faircloth ............... A01G 9/143 414/373 |
| 4,015,366 | A | * | 4/1977 | Hall, III ............... A01D 46/005 47/1.43 |
| 4,028,847 | A | * | 6/1977 | Davis ................... A01G 31/042 47/65 |
| 4,216,615 | A | * | 8/1980 | Soderberg ............. A01G 9/143 47/17 |
| 4,255,897 | A | * | 3/1981 | Ruthner ................ A01G 9/249 47/65 |
| 4,356,664 | A | * | 11/1982 | Ruthner ............... A01G 31/042 47/65 |
| 4,956,936 | A | * | 9/1990 | Sprung ................. A01G 9/247 47/21.1 |
| 5,016,541 | A | * | 5/1991 | Feaster, Jr. ............ A01G 9/143 104/96 |
| 5,029,665 | A | * | 7/1991 | Harada ................. A01G 9/143 239/173 |
| 5,131,185 | A | * | 7/1992 | Wingerden ............ A01G 9/086 47/73 |
| 5,252,108 | A | * | 10/1993 | Banks ................... A01G 9/143 47/17 |
| 5,303,505 | A | * | 4/1994 | Sumiyoshi ............. A01G 9/143 47/65 |
| 5,438,794 | A | * | 8/1995 | Wi ....................... A01G 9/143 47/17 |
| 5,843,376 | A | * | 12/1998 | Ishihara ................ G01N 35/04 422/64 |
| 5,884,224 | A | * | 3/1999 | McNabb ............... A01G 7/00 702/2 |
| 6,122,861 | A | * | 9/2000 | Kertz .................... A01G 31/04 47/65 |
| 8,234,814 | B2 | * | 8/2012 | Kertz .................... A01G 9/024 47/67 |
| 9,330,373 | B2 | * | 5/2016 | Mountz ................ G06Q 10/087 |
| 9,505,556 | B2 | * | 11/2016 | Razumov .............. B65G 1/0492 |
| 2003/0005626 | A1 | * | 1/2003 | Yoneda ................. A01G 9/246 47/69 |
| 2003/0121798 | A1 | * | 7/2003 | Iseki ..................... A01G 31/00 205/744 |
| 2004/0163308 | A1 | * | 8/2004 | Uchiyama ............. A01G 31/042 47/1.01 R |
| 2004/0244283 | A1 | * | 12/2004 | Chen ..................... A01G 9/246 47/17 |
| 2005/0138867 | A1 | * | 6/2005 | Zhao ..................... A01G 9/14 52/79.1 |
| 2006/0162252 | A1 | | 7/2006 | Lim |
| 2007/0172396 | A1 | * | 7/2007 | Neeper ............... G01N 35/0099 422/400 |
| 2007/0256356 | A1 | * | 11/2007 | Kap ...................... A01G 9/143 47/1.7 |
| 2008/0203043 | A1 | * | 8/2008 | Poortvliet .............. B62B 3/005 280/47.11 |
| 2008/0274494 | A1 | * | 11/2008 | Kertz .................... C12M 23/50 435/29 |
| 2009/0196725 | A1 | * | 8/2009 | Visser ................... A01G 9/086 414/751.1 |
| 2009/0214324 | A1 | * | 8/2009 | Grinnell ................ B66F 9/063 414/467 |
| 2011/0120002 | A1 | * | 5/2011 | Pettibone .............. A01G 31/042 47/65 |
| 2011/0131876 | A1 | * | 6/2011 | Pettibone .............. A01G 31/042 47/65 |
| 2012/0017507 | A1 | * | 1/2012 | Owens, Jr. ............ A01G 9/143 901/30 |
| 2012/0054061 | A1 | * | 3/2012 | Fok ...................... A01G 9/24 705/26.5 |
| 2012/0137578 | A1 | * | 6/2012 | Bradford .............. A01G 9/143 47/65.5 |
| 2012/0279122 | A1 | * | 11/2012 | Benne ................... A01G 31/045 47/60 |
| 2012/0324788 | A1 | * | 12/2012 | Sakura .................. A01G 31/04 47/66.6 |
| 2013/0006401 | A1 | * | 1/2013 | Shan ..................... H05B 45/20 700/90 |
| 2013/0019527 | A1 | * | 1/2013 | Howe-Sylvain ....... A01G 31/06 47/62 A |
| 2013/0104453 | A1 | * | 5/2013 | Hassle .................. A01C 21/00 47/17 |
| 2013/0305601 | A1 | * | 11/2013 | Park ...................... A01G 31/04 47/17 |
| 2014/0017043 | A1 | * | 1/2014 | Hirai .................... A01G 27/00 414/267 |
| 2014/0115958 | A1 | * | 5/2014 | Helene .................. A01G 31/06 47/17 |
| 2014/0144080 | A1 | * | 5/2014 | Gidekel ................ A01G 31/06 47/62 R |
| 2014/0259995 | A1 | * | 9/2014 | White ................... E04H 9/16 52/173.1 |
| 2015/0000191 | A1 | * | 1/2015 | Nagadome ............ A01G 7/045 47/66.6 |
| 2015/0014440 | A1 | * | 1/2015 | Nagadome ............ A01G 25/02 239/289 |
| 2015/0027048 | A1 | * | 1/2015 | Fok ..................... G06Q 30/0621 47/66.7 |
| 2015/0208592 | A1 | | 7/2015 | Marchildon |
| 2015/0282437 | A1 | * | 10/2015 | Ohara ................... A01G 7/045 47/66.6 |
| 2016/0066515 | A1 | * | 3/2016 | Palmieri, Jr. .......... A01G 9/249 47/17 |
| 2016/0073589 | A1 | * | 3/2016 | McNamara ........... A01G 18/20 47/1.1 |
| 2016/0192594 | A1 | * | 7/2016 | Mawendra ............ A01G 22/60 47/62 R |
| 2016/0302369 | A1 | * | 10/2016 | Pickell ................. A01G 31/045 |
| 2017/0055461 | A1 | * | 3/2017 | Neuhoff, Jr. ......... A01G 31/06 |
| 2017/0174431 | A1 | * | 6/2017 | Borders ................ B65G 1/0492 |
| 2018/0014486 | A1 | * | 1/2018 | Creechley ............. H04N 7/183 |
| 2018/0027747 | A1 | * | 2/2018 | Yoshida ................ A01G 9/246 |
| 2018/0035624 | A1 | * | 2/2018 | Itoh ...................... A01G 7/045 |
| 2018/0235156 | A1 | * | 8/2018 | Blair .................... A01G 27/003 |
| 2019/0133063 | A1 | * | 5/2019 | Bateman ............... A01G 7/045 |
| 2020/0205360 | A1 | * | 7/2020 | Tabakman ............ A01G 31/06 |

FOREIGN PATENT DOCUMENTS

| | | | | |
|---|---|---|---|---|
| CN | 104351033 | A | * | 2/2015 |
| CN | 105638429 | | | 6/2016 |
| DE | 2815168 | | | 10/1979 |
| DE | 10159422 | A1 | * | 6/2003 ............ A01G 9/143 |
| DE | 10343804 | A1 | * | 4/2005 ........... A01G 31/042 |
| DE | 10354569 | A1 | * | 6/2005 ............ A01G 9/143 |
| EP | 0352031 | A1 | * | 1/1990 ........... A01G 31/042 |
| EP | 0511715 | A1 | * | 4/1992 ........... A01G 31/042 |
| EP | 1600327 | A2 | * | 11/2005 ........... A01G 9/143 |
| EP | 1975089 | A1 | * | 10/2008 ........... A01G 9/143 |
| EP | 2710886 | A1 | * | 3/2014 ............ A01G 9/081 |
| EP | 2038492 | B1 | * | 9/2015 ............ A01G 9/1407 |
| FR | 2582188 | A1 | * | 5/1985 ............ A01G 9/143 |
| GB | 2078480 | A | * | 1/1982 ........... A01C 11/025 |
| JP | 2005087042 | A | * | 4/2005 |
| KR | 20090101554 | | | 9/2009 |
| KR | 101022025 | B1 | * | 8/2010 ............ A01G 9/143 |
| KR | 20110010317 | U | * | 11/2011 ........... A01G 9/143 |
| KR | 20140102161 | A | * | 8/2014 ............ A01G 31/06 |
| KR | 101458589 | B1 | * | 11/2014 ........... A01G 9/143 |
| KR | 20140141132 | A | * | 12/2014 |
| KR | 101781391 | B1 | * | 9/2017 ............ A01G 31/06 |
| KR | 20170133201 | A | * | 12/2017 ........... A01G 31/042 |
| NL | 9300609 | A | * | 11/1993 ........... A01G 9/143 |
| NL | 9401186 | A | * | 3/1996 ............ A01G 9/143 |
| NL | 1028749 | C2 | * | 10/2005 ............ A01G 5/00 |
| NL | 1030455 | C2 | * | 5/2007 ............ A01G 9/143 |
| RU | 2670924 | C1 | * | 10/2018 ........... A01G 31/00 |
| WO | WO-8503843 | A1 | * | 9/1985 ........... A01G 31/042 |
| WO | WO-02090219 | A1 | * | 11/2002 ........... A01G 9/088 |

(56) References Cited

FOREIGN PATENT DOCUMENTS

| WO | 2005079557 | 9/2005 | |
| WO | WO-2007142513 A1 * | 12/2007 | ............ A01G 9/086 |
| WO | 201008335 | 1/2010 | |
| WO | WO-2010008335 A1 * | 1/2010 | ........... A01G 31/042 |
| WO | 2013066254 | 5/2013 | |
| WO | WO-2013066253 A1 * | 5/2013 | ............ A01G 31/06 |
| WO | WO-2013129003 A1 * | 9/2013 | ............ A01G 9/143 |
| WO | 2013185136 | 12/2013 | |
| WO | WO-2013185136 A1 * | 12/2013 | ............ A01G 7/045 |
| WO | WO-2014109147 A1 * | 7/2014 | ............ A01G 9/143 |
| WO | WO-2014147267 A1 * | 9/2014 | ............ A01G 9/143 |
| WO | WO-2014157671 A1 * | 10/2014 | ............ A01G 31/06 |
| WO | WO-2014199917 A1 * | 12/2014 | ............ A01G 31/04 |
| WO | WO-2015022782 A1 * | 2/2015 | ............ A01G 9/14 |
| WO | WO-2017024353 A1 * | 2/2017 | ............ A01G 9/249 |

OTHER PUBLICATIONS

WIPO, Written Opinion in corresponding PCT application PCT/GB2017/051925, dated Oct. 16, 2017.

CIPO, Examination Search Report in corresponding CA application 3,028,899, dated May 10, 2022.

* cited by examiner

SYSTEMS AND METHODS FOR HYDROPONIC PLANT GROWTH

RELATED APPLICATIONS

This application claims priority under 35 U.S.C. § 120 to, and is a continuation of, co-pending International Application PCT/GB2017/051925, filed Jun. 30, 2017 and designating the US, which claims priority to GB Application 1611428.2, filed Jun. 30, 2016, such GB Application also being claimed priority to under 35 U.S.C. § 119. These GB and International applications are incorporated by reference herein in their entireties.

BACKGROUND

Field

The present invention relates generally to the growing of plants in the absence of soil, and finds particular, although not exclusive, utility in a hydroculture growing system.

SUMMARY

The environment within a greenhouse may be closely monitored and controlled. In particular, the temperature and humidity may be kept within a narrow range to best favour the healthy growth of plants therein. Greenhouses lend themselves in particular to the growing of plants by means of hydroculture in its broadest sense (that is, the growing of plants in the absence of soil), in particular hydroponics, basic-hydroculture/passive-hydroponics, aeroponics, fertigation, aggregate culture and/or aggregation; that is, the growing of plants in the absence of soil. In addition, plants grown within a greenhouse (e.g. having a controlled internal environment) and/or by means of such hydroculture methods may be done so without the use of pesticides (e.g. herbicides, insecticides, fungicides, anti-microbials and/or other forms of pesticides), and in some jurisdictions may be referred to as organic agriculture. Conventional greenhouses are designed not only to hold plants, but also to provide access to the plants by growers. Space within the greenhouse is not utilised efficiently. In addition, while sophisticated systems are often employed to provide feed and water to the plants, they are generally inefficient and result in a significant amount of the feed and water being wasted. Typically greenhouse crop production uses 85% of the floor area for growing crops.

According to a first aspect of the present invention, there is provided a soilless plant growing system (e.g. a hydroculture growing system), comprising: a conveyor for moving plants around a closed loop; a clean room in which the conveyor is located, the clean room provided with a filtered air supply and held at a pressure above ambient atmospheric pressure; a plurality of carriages configured to be mounted on the conveyor for movement thereon; and at least one tray configured to be received on each of the plurality of carriages, each tray configured for growing at least one plant in the absence of soil.

In particular, the conveyor may be configured to move a series of carriages around a closed loop. In this way, plants grown in the absence of soil may be moved around a growing room such that each plant receives a more even exposure to light than would be the case if static in the growing room. The growing room may be for instance approximately 50, 100, 115, 150 or 200 meters long, and may be oriented in an approximately East-West direction. The growing room may be for instance approximately 10, 20, 22, 30 or 50 m wide.

The system may comprise any number of carriages, for instance approximately 10, 20, 50, 100, 200, 500, 600, 650, 1000, 2000 or 5000 carriages. The conveyor may be operable with a maximum number of carriages thereon, the conveyor may be operable with a minimum number of carriages thereon, and/or the conveyor may be operable with an intermediate number of carriages thereon.

The closed loop may have a serpentine form. In particular, the closed loop may comprise a series of parallel and/or antiparallel legs. In this way, a maximum and even exposure to natural and artificial lighting for each tray may be achieved.

Each leg of the serpentine may be spaced from each other leg by between 0.5 m and 2 m, in particular between 1 m and 1.5 m, more particularly approximately 1.2 m.

The conveyor may comprise a track, and may be arranged such that the track may trace out a closed-loop pathway. The closed-loop pathway may be in two- or three-dimensions, for instance, arranged on a substantially flat floor, on a sloping floor, and/or on a tiered floor. In this way, the conveyor may be shaped to fit within any size and/or shape of building without wasting valuable growing space. In particular, the conveyor may include slopes of up to approximately 45 degrees, in particular up to approximately 30 degrees, more particularly up to approximately 10 degrees.

The pathway may be substantially polygonal in form. The pathway may have a form substantially that of a non-convex polygon and/or a concave polygon. That is, the pathway may have interior angels that are greater than 180 degrees.

The conveyor system may further comprise a second conveyor arranged such that the track traces out a second closed-loop pathway in three dimensions that substantially interweaves a first pathway of the first conveyor. The second conveyor may be configured to convey carriages in a sense opposite that of the first conveyor. The term 'sense' is intended to describe either substantially clockwise or anti-clockwise motion; that is, the rotational direction of the carriages around the conveyor. The first and second pathways may have the form substantially of a double helix.

The conveyor may drive the carriages. Alternatively, each carriage (or each group of carriages) may be individually powered.

The conveyor may comprise a track and a drive mechanism located adjacent to (and stationary with respect to) the track, for pushing the carriages around the track. The drive mechanism may be hydraulic and/or pneumatic. The drive mechanism may comprise only one, at least one, or a plurality of arms for pushing the carriages along the track.

The conveyor may comprise a track and a propulsion cord. The propulsion cord may be a rope, chain, cable, nylon cord, and/or other known type of cord. In one particular embodiment the conveyor may comprise a track and a cord parallel to the track. The track may be a tube, pipe or similar arrangement. In particular, the track may comprise a guide, through which the cord may be arranged to pass. The cord may be driven by a motor, such that the cord moves relative to the track.

The conveyor may comprise a belt conveyor.

The conveyor may comprise an inverted conveyor chain (e.g. with steel chain links) is used to pull carriages around the growing room. The chain may be housed in a flanged fabricated track which allows fixture of carriages thereto. The carriages may rotate on their axis for example for loading and unloading. At each end of conveyor run the gondolas may be individually re-orientated to change direction and follow track onto adjacent run.

The conveyor may be driven at a maximum and/or average speed of between approximately 1 m/minute and 15 m/minute, in particular between approximately 5 m/minute and 10 m/minute, more particularly between 7 and 8 m/minute, for instance approximately 7.5 m/minute.

The conveyor may be driven by only one or at least one motor, for instance between 2 and 20 motors, in particular, between 4 and 16 motors more particularly 8 or 12 motors. Each motor may have an output of between approximately 75 W and 60,000 W. For instance, in the case of a plurality of motors, each may have an output of between approximately 100 W and 50,000 W, in particular between 250 W and 30,000 W, for example approximately 15,000 W. Alternatively, in the case of a single motor, it may have an output of between approximately 1,000 W and 50,000 W, in particular between 20,000 W and 40,000 W, more particularly approximately 37,000 W. The conveyor may be between approximately 50 m and 2,000 m in length, for instance between approximately 500 m and 1,800 m, in particular between approximately 800 m and 1,600 m in length, more particularly approximately 800 m, 1,000 m, 1,400 m or 1,600 m in length.

The carriages may reside on the conveyor. The system may be provided with a guide (e.g. a rail) located above the carriages for stability and/or guiding the carriages on the conveyor. Each carriage may hold between 6 and 40 trays, in particular between 10 and 30 trays, more particularly approximately 20 trays. Each carriage may be between 1 m and 8 m tall, in particular between 3 m and 7 m, more particularly approximately 5 m tall (e.g. 5.1 m tall).

Each carriage may comprise a support frame for holding the tray(s). The support frame may comprise a substantially cuboidal, cylindrical, or any other shaped frame portion, and at least one tray supporting member disposed on the cylindrical frame portion per hydroculture growing tray to be carried on the support frame.

The support frame may be between approximately 50 cm and 2 m in width, in particular between approximately 70 cm and 120 cm in width, more particularly approximately 114 cm in width. The support frame may have an approximately square footprint, but may alternatively be rectangular. The support frame may be between approximately 50 cm and 6 m in height, for instance, between approximately 2 m and 5.5 m in height, in particular between approximately 3 m and 5.2 m in height, more particularly approximately 5.1 m in height.

The support frame may comprise more than one tray supporting member per hydroculture growing tray to be carried on the support frame. In this way, each tray may be supported in a stable position.

The support frame and/or the frame portion may be rotationally symmetric about the substantially vertical axis, in use.

The support frame and/or the frame portion may have 2-fold rotational symmetry about a substantially vertical axis, in use.

The support frame may be configured to carry more than one hydroculture growing tray thereon.

The support frame may be configured to carry at least one stack of hydroculture growing trays.

The support frame may be configured to carry a first hydroculture growing tray (or stack of hydroculture growing trays) on a first side of the support frame and a second (stack of) hydroculture growing tray(s) on a second side of the support frame. For instance, the support frame may be configured to carry 1, 2, 3 or 4 stacks of hydroculture growing trays.

Each stack of trays may comprise between approximately 3 and 20 trays, in particular between approximately 5 and 15 trays, more particularly 10 trays.

Each tray in a stack of trays may be spaced from each adjacent tray by between 10 and 60 cm, in particular 30 and 50 cm, more particularly approximately 40 cm.

Each tray may have a surface area available for growing plants of between 0.4 square meters and 2 square meters, in particular between 0.5 square meters and 1 square meter, more particularly approximately 0.6 square meters. The trays may be rectangular, or may alternatively be square, trapezoidal, or any other appropriate shape.

Each hydroculture growing tray may comprise a tray base having a substantially horizontal base portion and a perimeter wall. In this way, the hydroculture growing tray may be configured to hold water therein.

Each hydroculture growing tray may comprise a tray lid, the tray lid provided with at least one hole therein. The hole may be an access hole, which may be for allowing fluid, water and/or nutrients to pass into the tray. There may be only one access hole. Alternatively or additionally, the at least one hole may be a plant hole configured to hold a single plant to be grown by means of hydroculture, or any comparative method. Specifically, the plant hole may be for receiving a stem of a plant therethrough. There may be a single plant hole or a plurality of plant holes; for instance, between 2 and 200 holes, in particular between 5 and 150 holes, more particularly between 50 and 100 holes. Each plant hole may be configured to hold a single plant or a plurality of plants. Alternatively or additionally, each plant hole may be configured to hold a punnet of plants. In this way, the layout of plant holes may be chosen to suit a particular plant type. The plant hole may be of any shape. For instance, the plant hole may be shaped to accommodate a particular plant. The plant hole may be shaped to facilitate insertion or removal of a plant. The hole may be drilled or cut out. The hole may be a slot, it may be round, it may be square, or it may be any other shape.

The tray may be substantially rectangular in from; however, in preferred embodiments, the tray may be substantially trapezoidal in form. Other shapes for the tray are contemplated.

The tray base may comprise an exit hole configured to allow fluid to exit the tray. In this way, stale water can be removed from the tray.

A drain may be provided to convey water from the exit hole away from the tray for recycling, reuse and/or disposal. The drain may comprise a downpipe, for instance, formed as part of the carriage, in particular located centrally on the carriage, collecting water from each exit hole from each respective tray and conveying it away. In some alternative arrangements, the drain may comprise a plurality of channels, for instance one per tray, one per adjacent pair of trays or one per stack of trays. Such a drain may be located on a watering station, such that a carriage moves into position at the watering station such that water may be fed into and collected from each tray, before the carriage is moved on.

Optionally, the tray may further comprise a tube disposed with its axis substantially vertically within the exit hole such that fluid may only exit the tray when a fluid level within the tray is above some predefined height. In this way, plants to be grown by means of hydroculture within the tray may be maintained with a sufficient fluid supply. The tray may further comprise a grommet and/or washer disposed within the exit hole, configured to grip the tube. In this way, fluid may be prevented from unintentionally leaking from the tray. The axial position of the tube within the exit hole may be variable such that the predefined height above which fluid may exit the tray through the tube is variable. Alternatively or additionally, the tray may comprise a valve configured to allow water to reach a certain level before draining.

The trays may be configured to allow irrigation water and/or nutrient supply to be distributed to the plant roots intermittently and drain away. For instance, the trays may have a directional water distribution channel(s) formed within the trays, and may have individual drain connections, which may be attached to the carriages. The directional water distribution channel(s) may comprise a pattern of ridges to aid water and nutrient dispersal around tray and plant roots before draining away. The tray may allow for complete drainage of tray in-between waterings.

The present system may provide for example a fourfold increase in the usable growing area, or perhaps higher such as an increase of at least 5, 6 or specifically 6.2 times. That is, for every 1 square meter of greenhouse available for growing area in a single layer system, the present system is able to operate with an equivalent of approximately 4 square meters of the floor area by extending growing area into the vertical space.

The conveyor may be a floor-mounted/ground conveyor or conveying track. In this way, the carriages may be mounted upon the conveyor (rather than being suspended therefrom), such that an optimal amount of growing light may reach the plants without being obscured by an aerial conveyor track.

Each carriage may be removably replaceable on the conveyor. For instance, each carriage may be interchangeable with each other carriage. In this way, carriages may be removed for servicing (or some other purpose), and replacement carriages may be inserted.

The plurality of carriages may be arranged in a first order on the conveyor, and the plurality of carriages may be re-orderable on the conveyor into a second order. In this way, the carriages may be reordered to optimise growing conditions for the plants thereon.

The soilless plant growing system may further comprise a growing room in which the conveyor, carriages and trays are located, wherein the growing room may comprise light-transmissible windows, which may be composed of polycarbonate, glass, tinted glass and/or other light-transmissible material, for instance over the range of 400 to 700 nanometres.

The windows may be configured to diffuse incoming light. For instance, the windows may be translucent, but for instance not transparent. In this way, more light is available for photosynthesis without solar gain found in standard glasshouses which require the use of shade screens when irradiation from sun is high to prevent scorching of leaves and build-up of heat. The polycarbonate may be clear twinwall polycarbonate having a thickness of approximately 10 mm.

The growing room may comprise an air supply system, for instance an HVAC system. The air supply system may comprise a controller for varying air supply in response to one or more sensed variables, as discussed below.

The soilless plant growing system may further comprise lighting disposed adjacent to the conveyor, and configured to be stationary with respect thereto, such that each carriage passes the lighting as the carriage passes around the closed loop. For instance, the trays may face outwards and may pass under (e.g. led) lights on one, both or either side of the track. In this way, lighting (for instance to supplement natural light) may be easily installed and maintained. The lighting may be a plurality of LED lights. Maximising natural available light in addition to LED lights exposes plants to wider range of wavelengths of light which can impact on plant quality and physiological characteristics. A sensor may monitor (e.g. continuously) light levels and adjust as specified, thereby reducing energy use. The lighting may be configured to emit light substantially predominantly over the 400 to 700 nanometre range. The lighting may be provided at each level; that is, substantially above each tray in a stack on a carriage, for instance with trays passing underneath as they move along the conveyor. The movement evens out exposure to light within the tray and avoids heat build up or 'edge effect' observed in stationary systems.

The soilless plant growing system may further comprise at least one watering station configured to irrigate the plants on each carriage as the carriage is passed adjacent to the watering station. In particular, fresh water may be provided to the plants at the watering station. In this way, plumbing and watering systems may be minimised. The watering station may be configured to provide water supplemented with nutrients to the plants, such as plant food, but may alternatively/additionally be configured to supply fresh water if required. The watering system may be configured to spray the plants with aerosolised water (e.g. as a fine mist), and/or to simulate rain by spraying the plants with drops/droplets of water, and/or to provide a flow of water directly into the tray for the plants to draw up from the tray. However, in preferred embodiments, the watering station may be configured to ensure that the plants leaves remain dry during watering, to limit the risk of mould and decay, and avoids blocking transpiration. The nutrient levels at the watering/irrigation station may be continually monitored and/or adjusted according to plant requirements. This process is sometimes known as fertigation. A controller may be provided to control the action of the watering station, for instance in response to some sensed environmental conditions (e.g. air quality, for instance oxygen and/or carbon dioxide levels, temperature and/or humidity) and/or plant attributes (e.g. height, leaf size, leaf colour and/or overall colour).

The nutrient levels, pH of irrigation water, etc. may be monitored continuously, continually and/or intermittently, and may be adjustable throughout the crop cycle, with option to provide each carriage with different irrigation and nutrient solution depending on crop type and stage of growth. The irrigation delivery and water and nutrient management may be fully automated and monitored to feedback to the database. Irrigation may be adjusted by an operator as required; in particular, the operator may add supplements to improve plant heath, crop quality and/or nutritional value of the crop.

Irrigation stops may be pre-selected via a control system and database which may record the location and contents of each carriage, including for instance crop batch, varietal information, sowing date, harvest date and any other information that may be desire, include information related to nutrient delivery, temperature, humidity and lighting throughout the growing cycle. The controller/control system and database enables complete traceability from sowing to customer for each batch of crop product. Each carriage, tray and/or plant may be identifiable via radio-frequency identification, such that their respective locations may be tracked; however, other monitoring/tracking systems are also envisaged. Control of the system may allow for automated loading/unloading from the conveyor in response to tracking of the carriages/trays/plants.

The watering station may be configured to collect water run-off from the plants. In this way, water may be recycled for further use, if for example excess water is provided to the plants, and/or fresh water is provided to the plants in order to displace water contained within the trays.

The watering station may be configured to purify water run-off collected from the plants. In particular, the watering station may be configured to mechanically purify (e.g. filter), chemically purify, and/or use any other purification method (e.g. using UV light and/or living organisms). In this way, water run-off may be reused. Water recycled may be treated to remove microbial growth and/or salt build up. Stored water may be maintained by continuous aeration and circulation through filters.

The watering station(s) may comprise irrigation nozzles which deliver water and nutrients to each tray, flooding the plant roots before draining away. The watering station may have a separate line for flushing with disinfectant and draining of such, to prevent build up of biofilms, unlike conventional irrigation systems which may have extensive runs of pipes and drains to each location. Each carriage/tray may be supplied with a specified (dynamically controllable) volume of fluid/nutrient at each pass. Irrigation frequency and volume is specific to the stage of growth or individual plant requirements for each carriage/tray.

The clean room may be the growing room. In this way, the plants grown by means of hydroculture therein may be ready for consumption upon harvesting, without the need for subsequent washing, cleaning and/or sterilising.

The clean room maybe held at an air pressure above ambient pressure such that air flow out of the clean room is at a speed of at least 0.2 meters per second, in particular at least 0.5 meters per second, more particularly at least 1 meter per second. The clean room maybe held at an air pressure at least 5 Pascals above ambient pressure, in particular at least 10 Pascals, more particularly at least 20, 50 or 100 Pascals. External ambient atmospheric pressure may be continuously monitored, and internal clean room air pressure may be adjusted in response thereto. In this context, ambient air pressure may be an air pressure measured outside the clean room, which may be in the external atmosphere; however, conceivably it could be in an adjacent room such as an air lock room, itself held at a pressure above the external atmospheric pressure.

The air supply may be recirculated through high-efficiency particulate air (HEPA) and/or ultra-low particulate air (ULPA) filters to remove internally generated contaminants. The filters may be configured to remove particles of dust, bacteria and/or fungal spores. The filters may be configured to be efficient for removal of particles larger than 10 micrometers and/or 1 micrometer. The filters may comprise a pre-filter and a primary filter. The pre-filter may be configured to be efficient for removal of particles larger than 10 micrometers (e.g. EN 779 G4) and the primary filter may be configured to be efficient for removal of particles larger than 1 micrometer (e.g. EN 779 F9).

The system may be provided with a sensor for determining air quality and may comprise a controller for taking steps to return air quality to within a predetermined range in response to the sensor determining that the air quality is outside the predetermined range. The sensor may be configured to sense one or more environmental conditions (e.g. air quality, for instance oxygen and/or carbon dioxide levels, particulate levels, temperature and/or humidity). The controller may be configured to increase air recirculation, for increasing passage of air through the filter(s), thereby reducing particular concentration levels. Alternatively, the controller may be configured to increase/decrease temperature, humidity, oxygen and/or carbon dioxide levels, etc.

The clean room may be provided with an airlock and/or an air shower for entry and/or exit of people.

The clean room may be classified as ISO 1 to 9 on the ISO 14644-1 cleanroom standard.

The soilless plant growing system may further comprise automated carriage apparatus for removing and/or inserting a carriage from and/or onto the conveyor, respectively. For instance, this may take the form of a spur line such that points may be switched to allow one carriage to be moved/rolled/slid off the closed loop. In such embodiments, one carriage may be inserted and/or moved/rolled/slid onto the closed loop at the same time as another carriage is removed and/or moved/rolled/slid off the closed loop, for instance to produce a one-on-one-off system. In particular, the conveyor may comprise the closed loop and a spur line. The spur line may be connected to the closed loop at one point only. The spur line may be an open line such that carriages removed from the closed loop must retrace their path to be inserted back onto the closed loop. Alternatively or additionally, the spur line may comprise a loop such that carriages move in substantially only one direction on the loop. The spur line may be connected to the closed loop at more than one point, such that carriages move in substantially only one direction on the spur line. The spur line may comprise any suitable form of spur conveyor similar or different to the conveyor, which may for instance be configured and/or powered by any means discussed above or following.

Alternatively or additionally, the automated carriage apparatus may take the form of a crane or other lifting system for removing the carriage from the conveyor.

A cleaning station may be provided adjacent to the spur line and/or other form of automated carriage apparatus, for cleaning the carriages.

The soilless plant growing system may further comprise automated tray apparatus for removing and/or inserting a tray from and/or onto the carriages, respectively. In this way, planting and harvesting may be achieved at a single location, or at least a reduced number of locations, to enable economy of scale. The automated tray apparatus may comprise an automated tray removal apparatus and/or an automated tray insertion apparatus.

The automated tray apparatus may be located in a loading/unloading room. The loading/unloading room may comprise a clean room in a manner similar to the growing room. Alternatively or additionally, the loading/unloading room may be located in the clean room environment of the growing room. Movement between the loading/unloading room and the growing room may comprise moving through a decontamination region, air curtain and/or airlock, or similar, or alternatively, may comprise moving through a conventional non-airlock type portal, configured such that environmental conditions may be maintained at substantially different levels.

An automated tray conveyor may be provided for removing trays from the loading/unloading room and/or automated tray apparatus. The tray conveyor may move trays thus unloaded through a decontamination region and/or airlock, or similar.

The automated carriage apparatus may be configured/arranged to convey carriages from the conveyor to the automated tray apparatus. The automated tray apparatus may be located adjacent to the spur line and/or any other form of automated carriage apparatus. The automated tray apparatus may be located in the growing room.

A tray cleaning station may be provided adjacent to the automated tray apparatus, for cleaning the carriages.

In particular, automation minimises the need for persons to enter a clean room, and therefore improves cleanliness and minimises energy use.

The soilless plant growing system may further comprise at least one sensor configured to determine the maturity of plants present in a tray. The sensor may be configured to sense one or more environmental conditions (e.g. light, air quality, for instance oxygen and/or carbon dioxide levels, water levels, pH, electrical conductivity and/or microbiology profile, temperature and/or humidity) and/or plant attributes (e.g. height, leaf size, leaf colour and/or overall colour). The sensor could comprise CCTV, optionally in combination with automatic identification software to determine growth characteristics of plants.

For instance, the sensor may sense a height of the plants growing on a tray, such that in response to a specific height and/or threshold height being reached, the system may be configured to determine that the plants are ready to harvest. Similarly, if a height of the plants on the tray does not reach a predetermined threshold in a given period, the system may be configured to determine that the plants require additional light, water and/or other nutrients. Such a height sensor may comprise a camera and a height scale arranged such that the plants are moved between the camera and the height scale such that an operator can view images from the camera and determine the height of the plants.

A light sensor may be provided on each tray, on each carriage, or located at fixed locations around the conveyor.

Each carriage may be configured to be rotatable about a vertical axis while on the conveyor. For instance, the portion of the carriage holding the trays (e.g. the support frame) may be rotatable with respect to the portion of the carriage in contact with the conveyor. In this way each carriage may be rotated to make best use of available light.

The system may further comprise a rotating station (or a plurality thereof) located adjacent to the conveyor, for rotating a selected one of the carriages as it passes. The rotation mechanism may comprise an arm arranged to contact the support frame of each carriage as the conveyor moves the carriage past the arm. The arm may be a hook. Alternatively, the rotation mechanism may comprise a motor and an engagement means that may be provided on the carriage, on the conveyor and/or adjacent the conveyor. The rotation mechanism may be configured to rotate the support frame through an angle of up to approximately 360 degrees, in particular approximately 180 degrees, or alternatively approximately 90 degrees relative to the conveyor.

In alternative embodiments, each carriage may comprise, for example, a motor for rotating the carriage on demand.

A propagation room may be provided, which may be adjacent to the growing room, and may be provided with misting irrigation and/or grow on benches that may be configured to ebb and flow water, optionally containing nutrients provided to base of trays (sub irrigation). The propagation room may be a separate room that may be climate controlled and/or may be a clean room.

The propagation room may enable early growth of plants grown in plugs or on a mat. Propagation trays may be seeded by an automated process. Seed and grow media may be sanitised and pre-treated before use to enable clean and pathogen free production. Plants may be spaced during propagation before transfer to biohall/carriages at final spacing. The propagation area may have series of wheeled trolleys carrying propagation or biohall trays over 5-20 levels. Where mats are used for production of smaller plants, the mats may be suspended over a plastic-formed (e.g. reusable) tray insert which allows space for root development and aeration of the root zone. The propagation room may comprise a plurality of rooms, for instance a germination area (e.g. maintained at high humidity) and a grow-on area (e.g. with separate climate).

The propagation room may be linked to the growing room by a corridor which may also be used for loading and/or unloading plants, harvesting and moving cut product. The corridor may include at least one (e.g. only one, or a series) of belt conveyor(s) to transport trays to and from a loader and/or the automated tray apparatus.

The growing room may comprise a crop handling area therein. However, in preferred arrangements, a crop handling area is provided adjacent to the growing room. The crop handling area may comprise a harvesting area and/or a packing area. The automated carriage apparatus (e.g. spur line) may be arranged to move carriages between the growing room and the crop handling area, and/or the automated tray apparatus may be located within the crop handling area. Alternatively, the automated carriage apparatus may be located in the growing room, and/or the automated tray apparatus may be arranged to move trays between the growing room and the crop handling area.

The crop handling area may form part of the clean room, or may comprise a further clean room. In particular, the harvest area and/or the packing area may form part of the clean room, or may comprise a further clean room(s).

Movement between the growing room and the crop handling area and/or the harvest area, and/or between the harvest area and the packing area may comprise moving through a decontamination region, air curtain and/or airlock, or similar, or alternatively, may comprise moving through a conventional non-airlock type portal, configured such that environmental conditions may be maintained at substantially different levels.

The growing room may be held at a first predetermined set of environmental conditions (e.g. air quality, for instance oxygen and/or carbon dioxide levels, particulate levels, light/illumination level, temperature and/or humidity). The crop handling area may be held at a second predetermined set of environmental conditions (e.g. air quality, for instance oxygen and/or carbon dioxide levels, particulate levels, light/illumination level, temperature and/or humidity) that may be different from the first predetermined set of environmental conditions. In particular, the harvest area may be held at a second predetermined set of environmental conditions (e.g. air quality, for instance oxygen and/or carbon dioxide levels, particulate levels, light/illumination level, temperature and/or humidity) that may be different from the first predetermined set of environmental conditions, and/or the packing area may be held at a third predetermined set of environmental conditions (e.g. air quality, for instance oxygen and/or carbon dioxide levels, particulate levels, light/illumination level, temperature and/or humidity) that may be different from the first and/or second predetermined set of environmental conditions.

For example, the second predetermined set of environmental conditions may include a lower temperature, lower light level and/or higher humidity than those of the first predetermined set of environmental conditions. Similarly, the third predetermined set of environmental conditions may include a lower temperature, lower light level and/or higher humidity than those of the second predetermined set of environmental conditions. Specifically, the second and/or third predetermined set of environmental conditions may include a temperature of between 6 and 20 degrees centigrade, in particular between 8 and 18 degrees centigrade, more particularly between 10 and 15 degrees centigrade, for example approximately 12 degrees centigrade. The second and/or third predetermined set of environmental conditions may include a light level of substantially zero.

The second and/or third predetermined set of environmental conditions may be varied and/or variable. In particular, the temperature may be lowered, the light level may be lowered and/or humidity the humidity may be raised gradually in response to plants being moved from the growing room into the crop handling area, the harvest area and/or the packing area, and/or the temperature may be lowered, the light level may be lowered and/or humidity the humidity may be raised gradually in response to plants being moved from the harvest area into the packing area. Specifically, the second and third environmental conditions may initially be substantially equal to the first environmental conditions.

The system may be constructed from stainless steel, food grade plastics material, etc.

According to a second aspect of the present invention, there is provided a method of growing a plant in the absence of soil (e.g. by means of hydroculture, or conventional methods), the method comprising: providing a soilless plant growing system of the first aspect; placing a plant on the tray; placing the tray on the carriage; placing the carriage on the conveyor; and moving the carriage on the conveyor around the closed loop.

The exact amount of time and conditions required for growing plants depends on the plant variety in question; however, for the sake of example only, seedlings may be placed in a growing on area between approximately 1 and 10 days after germination, in particular, between approximately 2 and 5 days. The seedlings may be grown in the growing on area for between approximately 3 and 7 days, up to a maximum of 20 days. The growing on area need not necessarily be provided with natural light, but may be provided with natural light, and may also or alternatively be provided with artificial light. The seedlings may be transferred to the carriage from the growing on area, for instance once roots are developed sufficiently. The seedlings may be transferred to the carriage once they are mature, for instance after approximately 6-10 days after propagation. They may be transferred to a hydroculture growing tray whilst in the growing on area.

Plants may be placed in hydroculture growing trays. The hydroculture growing trays may be placed on the support frame of the carriage. The carriage may be exposed to sunlight between approximately 7 hours and approximately 18 hours per day. The carriage may be moved on the conveyor between approximately 7 hours and approximately 24 hours per day, in particular, between approximately 12 hours and approximately 21 hours per day, more particularly approximately 18 hours per day.

The location of the growing tray on the carriage may be changed at a frequency of between approximately 1 day and approximately 2 weeks, in particular between approximately 4 days and approximately 10 days, more particularly approximately 1 week. Crops, for instance leaves, may be harvested from the mature plants at a frequency of between approximately 7 days and approximately 28 days, in particular between approximately 12 days and approximately 20 days. More particularly, food, for instance leaves, may be harvested from the mature plants after approximately 12 days, 24 days and 36 days on the conveyor. Food, for instance leaves, may be harvested from the mature plants at most between approximately 1 and 20 times (e.g. lettuce may be single cut), in particular between 3 and 7 times (e.g. for leafy crops, such as watercress). The method may include at least one sacrificial harvest, being the final harvest, after which the plant may be disposed of. Between approximately 10 and 60 percent of the plants may be harvested each week.

Grow media, seeds and nutrients may be sanitised and may conform to strict bio control practices. Such items entering the clean area may be passed through a sanitising area prior to introduction into the clean area.

The system is ideally suited to cultivation of fast-growing, small-sized, leafy plants and flowers, in particular herbs, salad and brassicas, for instance watercress.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
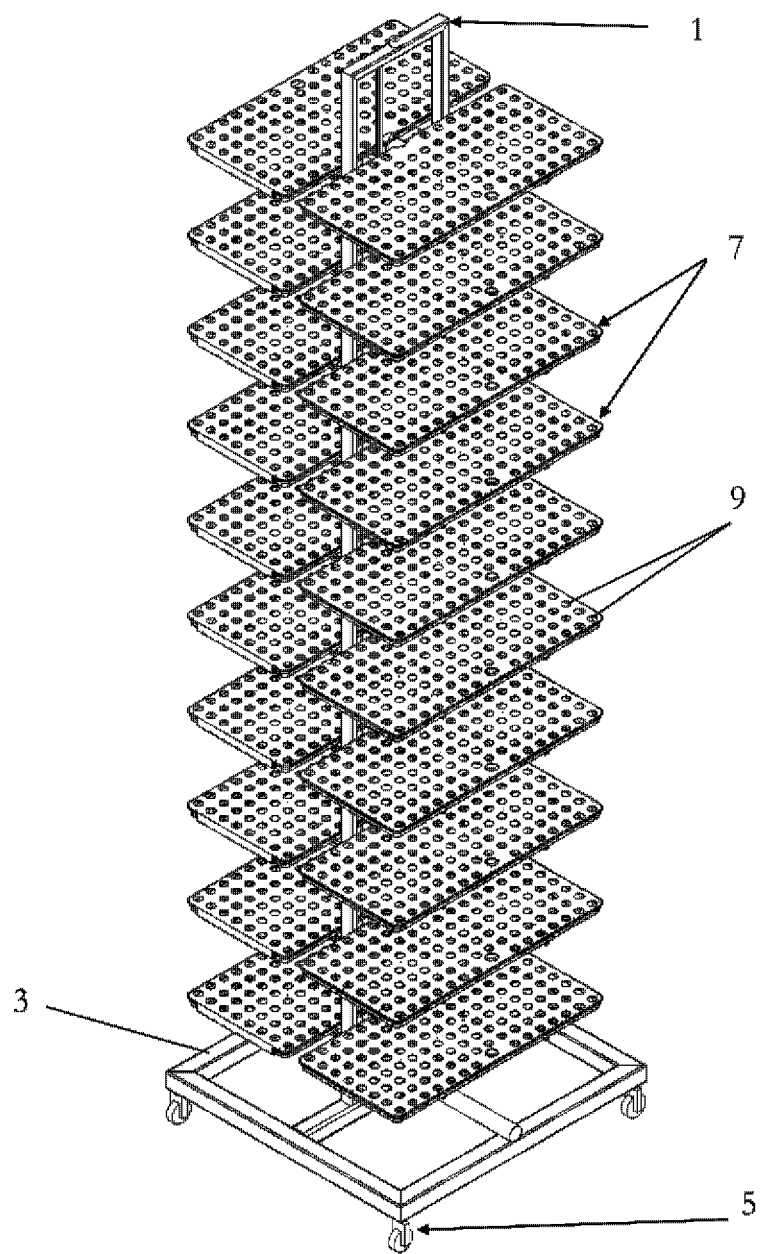
FIG. 1 is a perspective view of a carriage for use in a soilless plant growing system.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 is a perspective view of a carriage for use in a soilless plant growing system. The carriage comprises a frame 1 vertically projecting upwards from a stand 3 and configured to be rotatably connected to the stand 3, such that the frame 1 may be rotated about a vertical axis with respect to the stand 3. The stand is provided with a conveyor engagement mechanism 5 that may be in the form of wheels for engaging a track of the conveyor.

The frame 1 is provided with a plurality of tray supports (not shown) for holding two vertical stacks of trays 7 thereon, each stack comprising ten trays 7. Each tray 7 includes a lid having an array of holes 9 therethrough, for holding plants to be grown by means of hydroculture therein. The trays may comprise approximately one hundred holes each, but may alternatively comprise other numbers of holes, for instance between three holes and five hundred holes, in particular between five and three hundred, more particularly between fifty and one-hundred-and-fifty. The trays 7 in each stack are arranged to be spaced from one another vertically be a common distance; however, differing distances or variable distances (for instance by having movable and/or removable tray supports) are also envisaged.

In an alternative arrangement, the trays may not be provided with lids with holes, but may be provided with a mat (e.g. fleece, synthetic fleece, wool, hessian, hemp, coir, coconut fibre, mineral wool or other forms of mat). The mat may be flexible, and therefore the mat may be provided on a rigid grid/lattice on the tray, to support the mat above the tray base.

Figure 2:
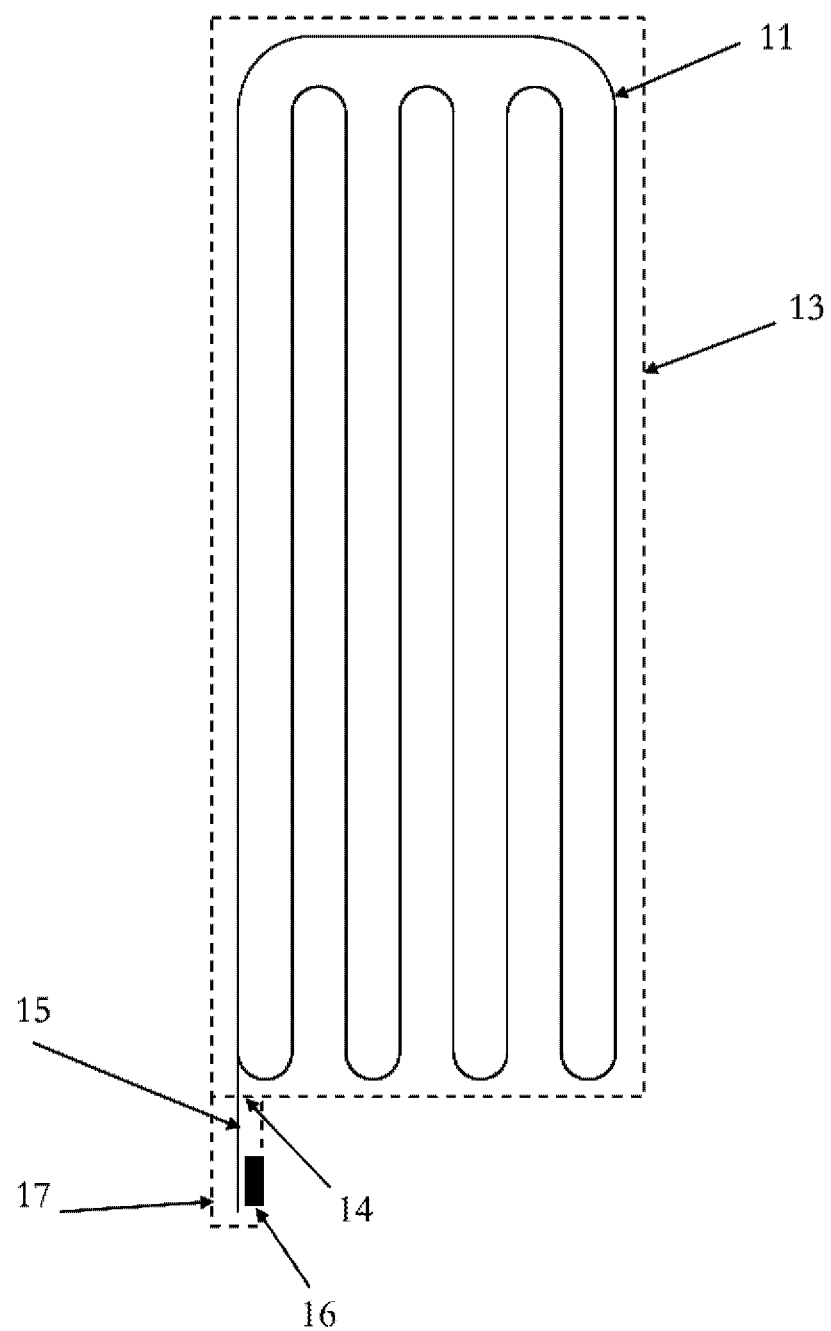
FIG. 2 is a schematic view of closed-loop path of a conveyor for use in a soilless plant growing system.

FIG. 2 is a schematic view of closed-loop path 11 of a conveyor in a growing room 13. The path 11 is of a substantially serpentine form having portions that zig-zag or return parallel/antiparallel to one another. The path 11 may comprise a spur 15 along which carriages may be diverted, so that they may be taken to a loading/unloading area 17 (which may be separate from the growing room 13 in that it may be held under atmospheric conditions conducive to harvesting plants (e.g. cooler than the growing room), and/or conducive to propagating plants (i.e. warmer than the growing room, for growing-on). Alternatively, the loading/unloading area 17 may be within the growing room 13. An airlock 14 may be between loading/unloading area 17 and the growing room 13. The invention may comprise more than one spur 15, or even a secondary spur from the spur 15, for instance one leading to a propagation room and one leading to a harvesting room. A cleaning station 16 may be provided adjacent to the spur 15.

Figure 3:
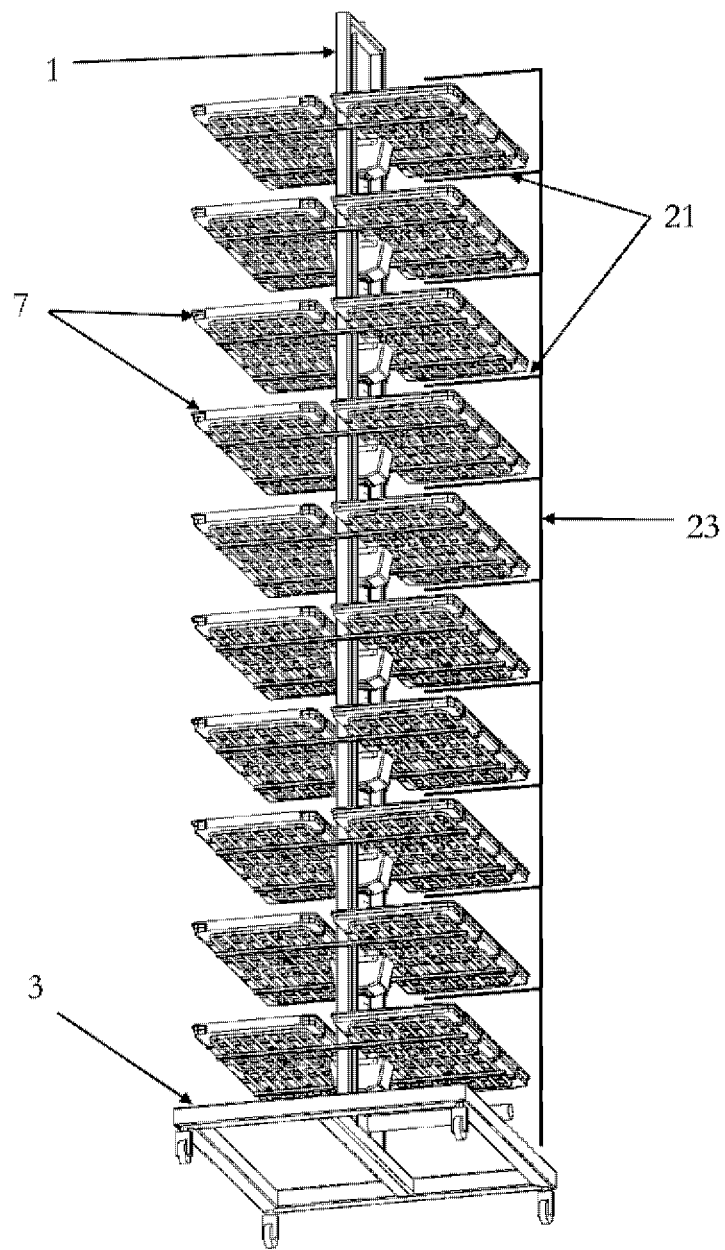
FIG. 3 is a schematic view of a lighting arrangement for use with the carriage of FIG. 1.

FIG. 3 is a schematic view of a lighting arrangement for use with the carriage of FIG. 1. The lighting arrangement is shown on one side of the carriage only, for instance where the carriage is located adjacent to a side of the growing room directly illuminated by sunlight; however, arrangements are considered in which lighting is provided on both sides, for instance in portions of the growing room that are not adjacent to the side of the growing room directly illuminated by sunlight. LED lights 21 are provided immediately beneath an upper tray 7 to illuminate a tray 7 below. The lights 21 may be provided on a line/wire running substantially parallel to the conveyor, such that trays 7 from multiple carriages may be illuminated by a single line of lights 21, and may pass unhindered along the conveyor. Each line of lights 21 may be supported by upright posts 23 or similar arrangements spaced along the line, and power to the lights 21 may be provided by a power cable running up from ground level, for instance up one of the posts 23. The lights may be located substantially entirely along the path of the conveyor, except where they may interfere with other operations, such as movement means, watering stations, loading/unloading points, sensors, etc.

Figure 4:
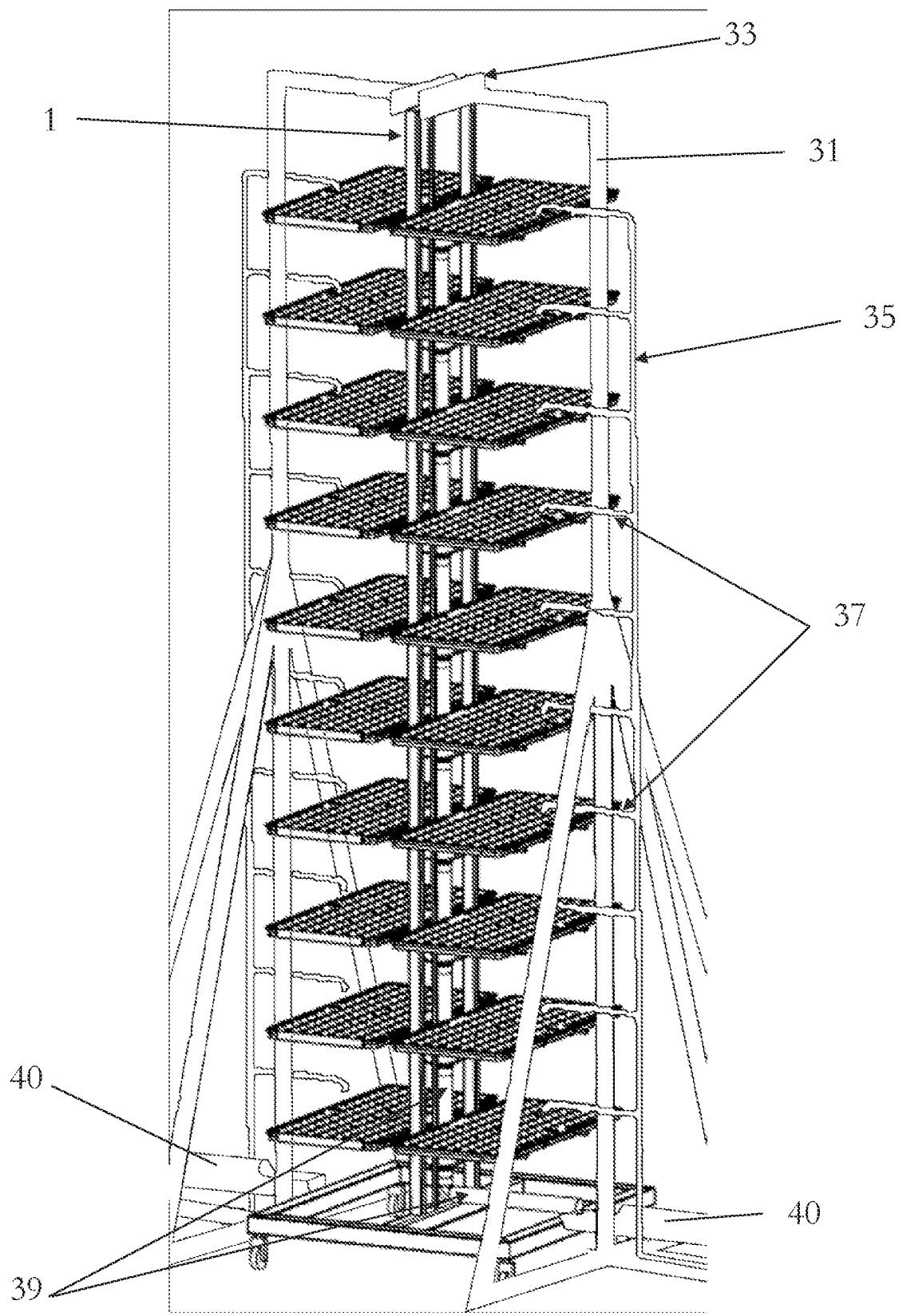
FIG. 4 is a perspective view of a watering station for use with the carriage of FIG. 1.

FIG. 4 is a perspective view of a watering station for use with the carriage of FIG. 1. The watering station comprises a support frame 31, which in some optional arrangements includes a retention mechanism 33 for holding the carriage (in particular the frame 1) in the watering station. Running up the support frame 31 are water supply pipes 35 (one for each stack of trays 7), having water feed outlets 37 arranged for each tray 7 of the stack.

Water may be fed into each tray through one of the holes 9, and/or a bespoke water feed hole. Excess water from each tray 7 may leave that tray and be collected by a drain mechanism 39, for possibly disposal and/or reuse. The drain mechanism 39 may comprise a series of funnels, each disposed beneath a respective tray 7. The drain mechanism 39 may direct the water run-off into a purifying system 40, which may purify the water run-off by filtering, and at least one of: chemically purifying, UV light purifying and living organism purifying.

Figure 5:
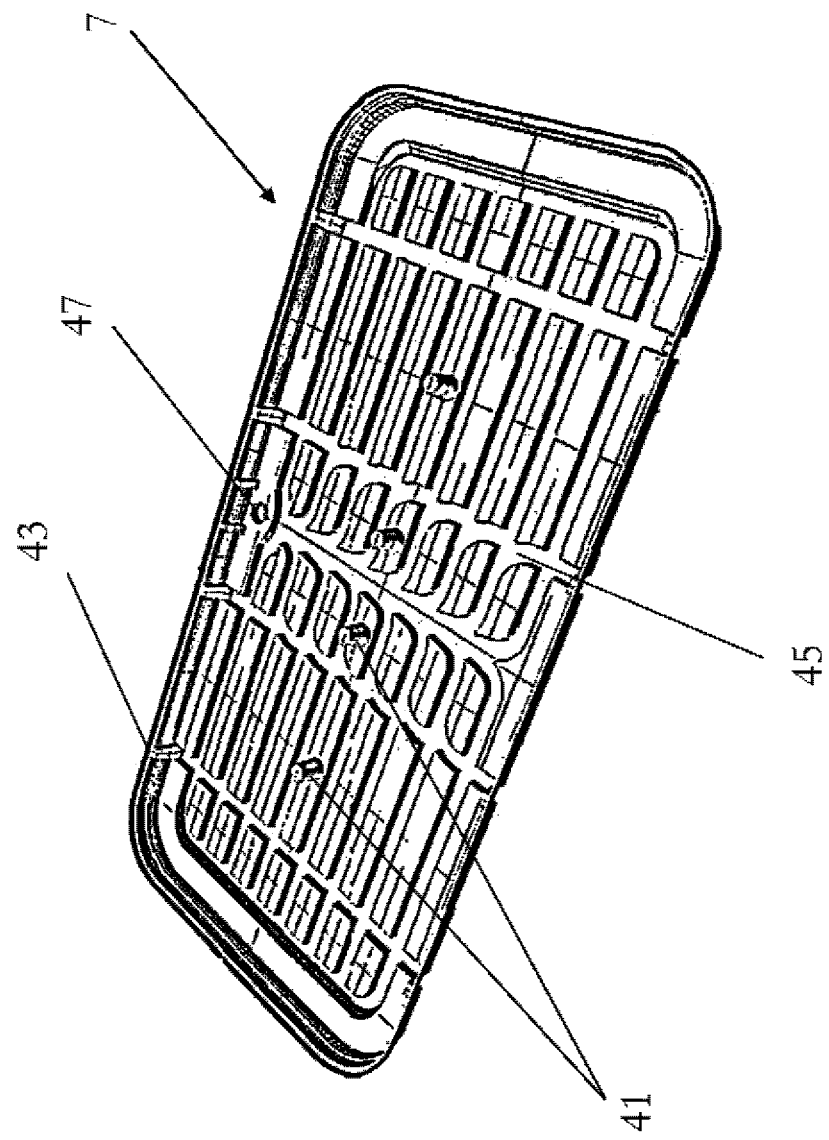
FIG. 5 is a perspective view of a tray for use in a soilless plant growing system.

FIG. 5 is a perspective view of a base of a tray 7 without its lid. The tray 7 includes upward projections 41 from the base for supporting a middle portion of the lid thereon, and also a peripheral lip 43 for supporting a periphery of the lid thereon. The lower surface of the tray 7 includes a recessed arrangement of interconnected channels 45 for retaining water therein, such that roots of plants contained within the tray may extend into the water. The tray may be configured such that the holes in the tray lid are located above the channels 45. A tray overflow 47 is provided in the tray, separate from the channels 45 such that if excess water is introduced into the tray, such that the channels 45 overflow, it may exit the tray 7 via the overflow 47. In particular, when water is introduced at the watering station, it is envisaged that excess water be provided intentionally in order to, at least partially, displace existing water from the channels 45 in favour of the newly introduced water. The overflow 47 may be located such that water exiting the tray is collected by funnels of the drain mechanism 39.

Figure 6:
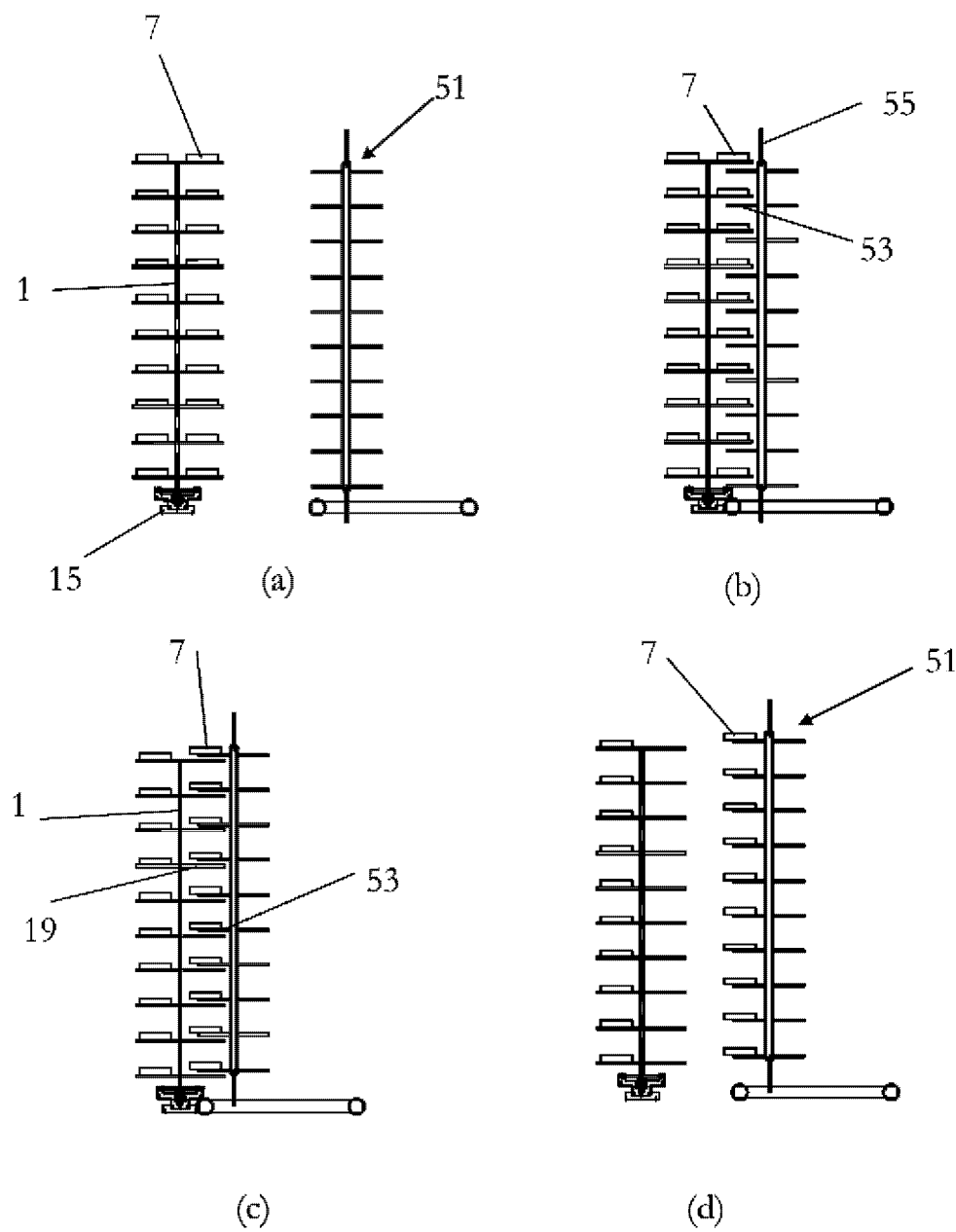
FIG. 6 is a sequence of views showing the mechanism for unloading trays from a carriage.

FIG. 6 is a sequence of views showing the mechanism for unloading trays from a carriage.

In (a), a carriage loaded with trays 7 on a frame 1 is shown on a spur 15 of the conveyor. An unloading mechanism 51 is shown spaced from the carriage.

In (b), the unloading mechanism 51 is moved into engagement position with the carriage such that each unloading support 53 on the unloading frame 55 is located (immediately) below a respective tray 7.

In (c), the unloading supports 53 are raised to lift the trays 7 off the frame 1 (in particular off the tray supports 19). This may be achieved by the tray supports 19 being horizontally offset from the unloading supports 53 with respect to the frame 1.

In (d), the unloading mechanism 51, now loaded with trays 7, is moved out of the engagement position with the carriage.

In alternative arrangements, it may be the carriage that is moved up/down, or the carriage on the spur that is moved into/out of the engagement position, rather than the unloading mechanism 51.

The carriage and/or the unloading mechanism 51 may subsequently be rotated in order to remove the trays 7 from the stack on the opposing side of the carriage.

A similar operation for loading trays onto the carriage is also envisaged, for example operating in reverse to the sequence laid out above. Loading/unloading may take place on the closed loop of the conveyor 11 instead of the spur 15, in certain arrangements.

The trays 7 may be brought down by mechanical means to ground level where they are fed onto a further conveyor (e.g. a roller belt conveyor) to be moved to harvesting operation. During harvesting, the trays pass through a cutting line such that the cut product is conveyed to a packing line. The trays may be removed from the system for sanitising and/or replanting, or for crops with multiple cuts (i.e. harvesting at several points during an individual plants growth) the trays may be replaced back onto a carriage or the same carriage.

The harvesting area may operate under cool climate control to maximise freshness of harvested product.

The invention claimed is:

1. A soilless plant growing system, comprising:
    a conveyor for moving plants around a closed loop, wherein the conveyor is a floor-mounted conveyor;
    a clean room in which the conveyor is located, wherein the clean room is a growing room held at a first set of environmental conditions, provided with a filtered air supply, and held at a pressure above ambient atmospheric pressure;
    a plurality of carriages configured to be mounted on the conveyor for movement thereon;
    a crop handling area separate from the clean room, wherein the crop handling area is held at a second set of environmental conditions different from the first set of environmental conditions and including a light level of substantially zero;
    an airlock between the clean room and the crop handling area configured to maintain the first set and the second set of environmental conditions at substantially different levels between the clean room and the crop handling area;
    an automated carriage apparatus including a spur line, wherein the automated carriage apparatus is configured to move a carriage of the plurality of carriages through the airlock, to the crop handling area from the clean room, wherein the automated carriage apparatus is configured to remove one of the plurality of carriages from the conveyor and/or insert one of the carriages onto the conveyor;
    a cleaning station adjacent to the spur line for cleaning the carriages;

at least one tray configured to be received on each of the plurality of carriages, each tray configured for growing at least one plant in the absence of soil;

an automated tray apparatus configured to remove the tray from the carriages and/or insert the tray onto the carriages; and at least one watering station configured to:
  irrigate the plants on each carriage as the carriage is passed adjacent to the watering station,
  collect water run-off from the plants, and
  purify the water run-off collected from the plants by:
    filtering, and
    at least one of: chemically purifying, UV light purifying, and living organism purifying.

2. The soilless plant growing system of claim 1, wherein each carriage is removably replaceable on the conveyor.

3. The soilless plant growing system of claim 1, wherein the plurality of carriages are arranged in a first order on the conveyor, and wherein the plurality of carriages are re-orderable on the conveyor into a second order, to optimize growing conditions for the plants thereon.

4. The soilless plant growing system of claim 1, wherein the clean room comprises light-transmissible windows composed of polycarbonate and configured to diffuse incoming light.

5. The soilless plant growing system of claim 1, further comprising lighting disposed adjacent to the conveyor, and configured to be stationary with respect thereto, such that each carriage passes the lighting as the carriage passes around the closed loop.

6. The soilless plant growing system of claim 1, further comprising at least one sensor configured to determine the maturity of plants present in a tray of the at least one tray.

7. A method of growing a plant in the absence of soil, the method comprising:
  providing a soilless plant growing system of claim 1;
  placing a plant on a tray of the at least one tray;
  placing the tray on the carriage;
  placing the carriage on the conveyor;
  moving the carriage on the conveyor around the closed loop;
  providing the clean room with a filtered air supply; and
  holding the clean room at a pressure above ambient atmospheric pressure.

* * * * *